S. F. DOUGLASS.
TRACTOR FOR VEHICLES.
APPLICATION FILED JUNE 15, 1912.
1,089,696.
Patented Mar. 10, 1914.
3 SHEETS—SHEET 1.
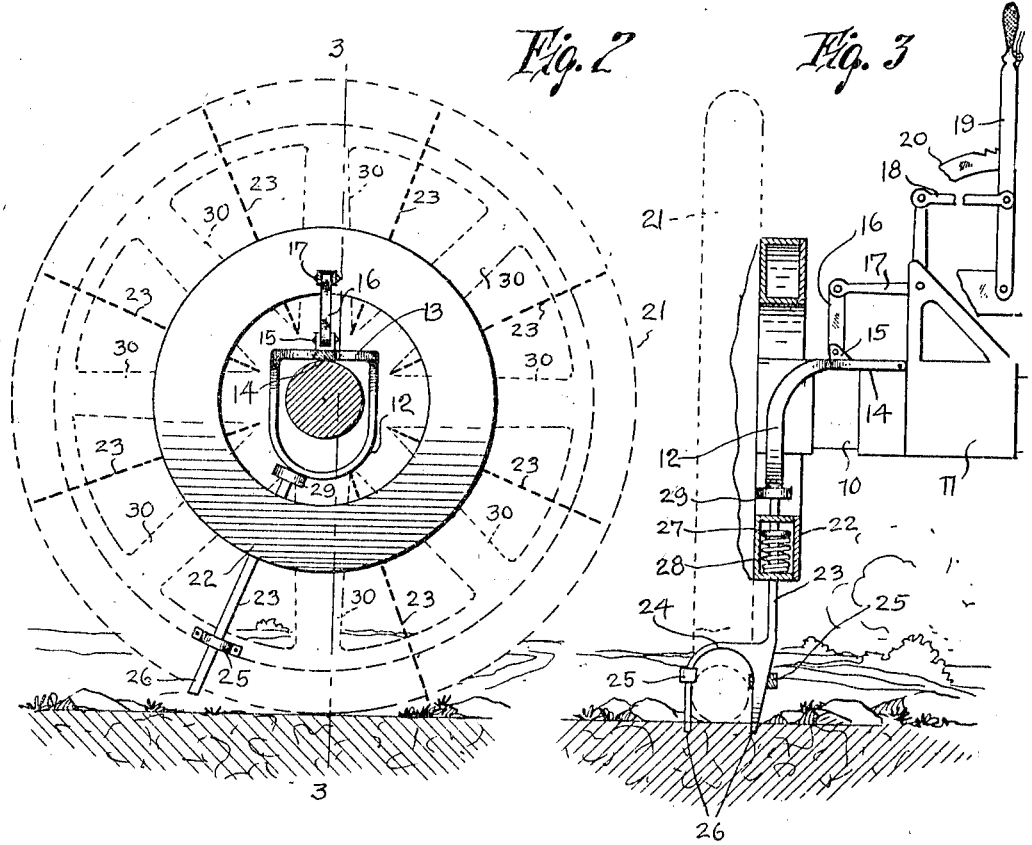
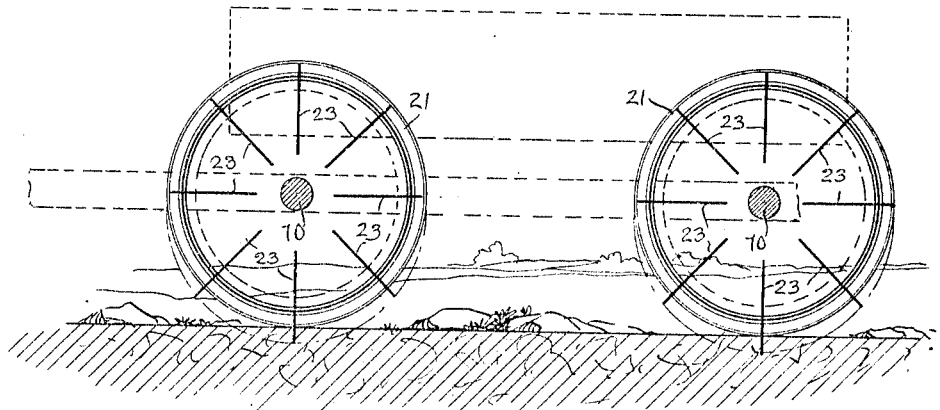
WITNESSES
Robert M. Sutphen
INVENTOR
Samuel F. Douglass
By his Attorney

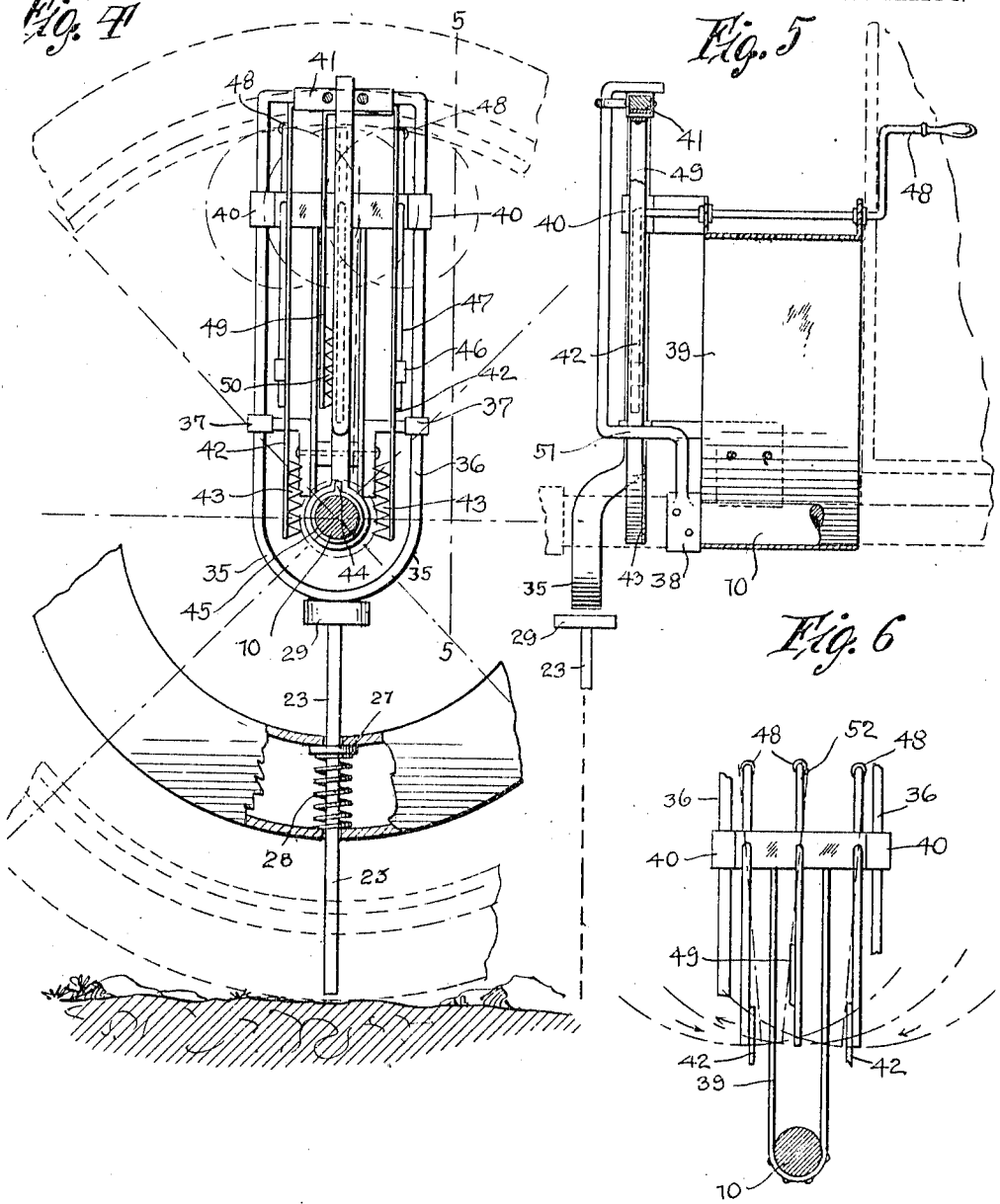

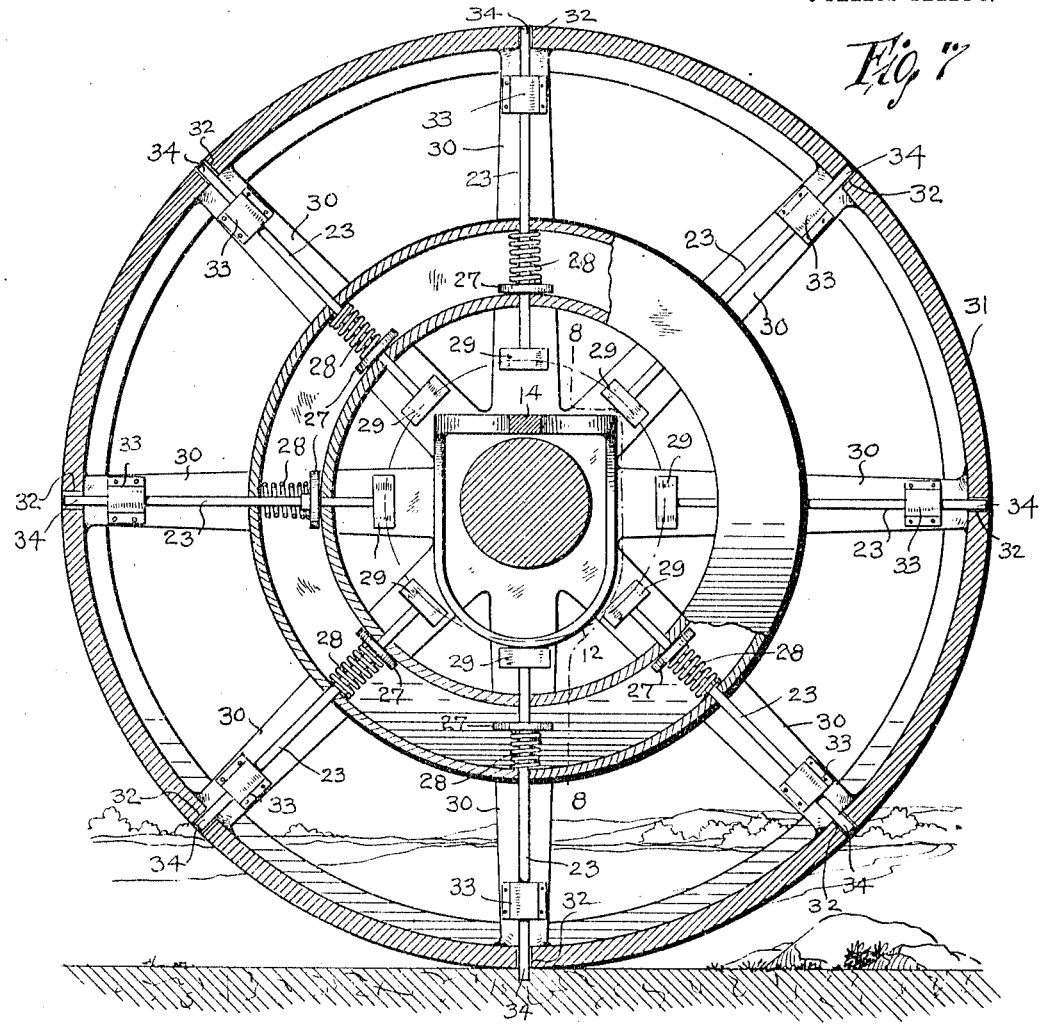
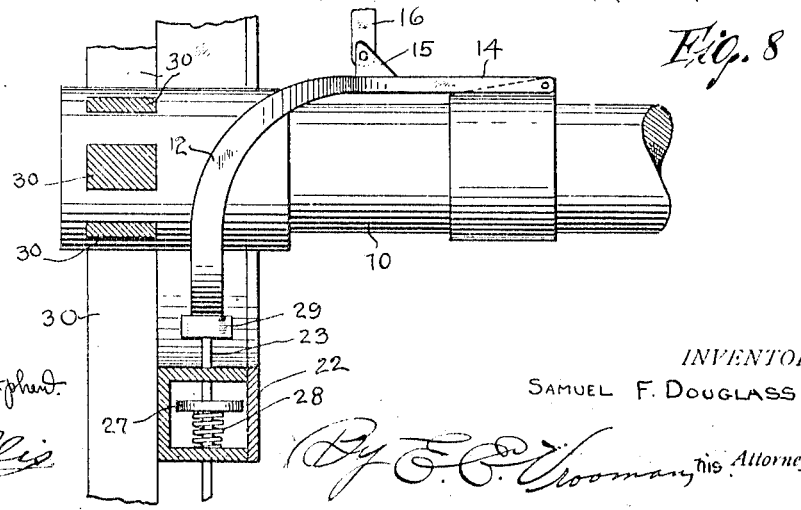

UNITED STATES PATENT OFFICE.

SAMUEL F. DOUGLASS, OF PRAIRIE DU ROCHER, ILLINOIS.

TRACTOR FOR VEHICLES.

1,089,696.  Specification of Letters Patent.  Patented Mar. 10, 1914.

Application filed June 15, 1912. Serial No. 703,873.

*To all whom it may concern:*

Be it known that I, SAMUEL F. DOUGLASS, a citizen of the United States, residing at Prairie du Rocher, in the county of Randolph and State of Illinois, have invented certain new and useful Improvements in Tractors for Vehicles, of which the following is a specification, reference being had therein to the accompanying drawing.

This invention relates to vehicles and has special reference to a novel arrangement of tractor means for wheels of a vehicle.

One of the objects of the invention is to improve the general construction of devices of this character and render it possible to use or not use tractor blades carried by a wheel.

Another object of the invention is to provide improved means whereby tractor blades may be projected successively beyond the rim of a wheel while the same rotates.

With the above and other objects in view, the invention consists in general of certain novel constructions, combinations and arrangements of parts as will be hereinafter fully described, illustrated in the accompanying drawings, and specifically claimed.

In the accompanying drawings, like characters of reference indicate like parts in the several views, and Figure 1 is a side elevation of a wagon equipped with wheels having the improved tractor blade, the elevation being diagrammatically shown. Fig. 2 is a detail view showing the manner of projecting a tractor blade or spur when used in connection with the pneumatically tired wheel. Fig. 3 is a section on the line 3—3, Fig. 2. Fig. 4 is a side elevation showing the arrangement used when a sliding tractor is used. Fig. 5 is a section on the line 5—5, Fig. 4. Fig. 6 is a view partly diagrammatic showing the positions of certain levers used to control the mechanism of Figs. 4 and 5. Fig. 7 is an enlarged vertical section through a wheel having a solid rim. Fig. 8 is a section on the line 8—8, Fig. 7.

In the form of the invention illustrated in Figs. 2 and 3 the axle 10 of the vehicle is secured thereto by a bracket 11 and pivoted on this bracket is a cam member consisting of a laterally curved U-shaped portion 12 having its arms united by a cross bar 13 and being provided with a single arm 14, extending from the cross bar 13 and pivoted to the bracket 11. On the single arm 14 is a lug 15 whereto is pivotally connected a link 16, the upper end of which is connected to one arm of a bell crank lever 17 pivoted between its ends to the bracket 11. The other arm of this bell crank lever is connected by means of the rod 18 with a latch lever 19 suitably pivoted on the vehicle and on the vehicle is also provided a suitable quadrant 20 for engagement with the latch lever.

At 21 is indicated the wheel of the vehicle the same being shown as of the pneumatic tired variety. Secured to this wheel is an annular casing 22 wherethrough extends a series of tractor blade arms 23, each of which is provided with a yoke 24 which straddles the wheel rim and which is held in position relative thereto by means of guides 25. Each of the yokes is provided with suitable ends or points 26 to constitute tractor means so that when projected beyond the rim of the wheel these points engage in the ground and prevent slipping of the wheel either by rotation or moving sidewise. Within the casing 22 each arm 23 is provided with a collar 27 and between this collar and the outer face of the casing is a coil spring 28 which surrounds the arm 23 and normally presses the same inwardly from the rim of the wheel. Furthermore each arm 23 projects through the annular casing and has on its extremity a head 29.

In the modified form shown in Figs. 7 and 8 a wheel 30 having a solid rim 31 is provided. In this rim is a series of openings 32 and on each spoke is a guide 33 through which the tractor blade arm 23 passes. In this form each arm is provided with a single blade 34 which is arranged to project when desired through its respective opening. In the operation of this part of the device it will be noted, upon observation of Figs. 2 and 7 that when it is desired to project the tractor blade or point beyond the rim the lever 19 is so moved as to depress the bight or curved portion of the U-shaped cam member 12 so that as the respective head 29 passes around the same it will be engaged by this curved portion and forced outward, the respective spring 28 being compressed to permit of such movement.

In order to remove the necessity of operating the device by hand the mechanism illustrated in Figs. 4 to 6 may be employed. The wheel used in combination with this frame is provided with the casing 22 wherethrough extend the slidable tractor arms 23. Within the casing 22 each arm 23 is provided with a collar 27 and between this collar and the outer face of the casing is a coil spring 28 which surrounds the arm 23 normally pressing the same inwardly from the rim of the wheel. Furthermore each arm 23 projects through the angular casing and has at its outer extremity a head 29. In this mechanism the cam member comprises a U-shaped bar having an arcuate cam end 35 and provided with reversely curved legs 36 which pass through guides 37 formed on a bracket 38 carried on the axle 10. This axle also supports a bracket 39 which is provided with guides 40 for the upper end of the cam member arms. The upper ends of the arms 36 are connected by the yoke 41 and depending from this yoke is a pair of arms 42 each of which is provided at its lower end with teeth 43 adapted to be engaged by a lug 44 formed on a collar 45 fixed to the shaft 10. Each of the arms 42 is provided with an ear 46 wherethrough passes the arm 47 of an operating lever pivotally supported on the bracket 39 and provided with the operating handle 48. Centrally disposed and depending from the yoke 41 is a short arm 49 provided with teeth 50 and this arm is arranged to engage beneath the bent portion 51 of the bracket 38 as the device is depressed. The position of the arm 49 is regulated by means of a lever 52 similar in all respects to the levers 47.

Now when the vehicle is in motion the lug 44 will be constantly rotated and if one of the arms 42 be moved toward it by properly actuating the handle 48 this lug will engage the teeth 43 and draw down the cam bar. One of the teeth 50 will engage beneath the part 51 when the bar is down and hold the cam bar from rising. If it is again desired to lift the cam bar it is simply necessary to release the same when the action of the springs will push the bar up to raised position, while the bearing of the heads 29 upon the cam will normally hold the same in a raised position. It will be noted that whether the vehicle is going ahead or backward the forcing down action may be accomplished, this being due to the provision of two arms 42.

There has thus been provided a simple and efficient device of the kind described, and for the purpose specified.

Having thus described the invention, what is claimed as new, is:—

1. In a device of the kind described, an axle, a wheel carried by said axle, a collar carried by said axle, a series of tractor blades slidably mounted upon said wheel, a movable cam supported adjacent the wheel, said tractor blades having heads adapted to engage said cam, a means to move said cam and cause successive engagement of the heads therewith, said means comprising a frame carried by said axle, and supporting said movable cam, toothed bars carried by said frame, and a lug carried by said collar and projecting therefrom, and adapted to engage said toothed bars.

2. In a device of the kind described, an axle, a wheel carried by said axle, a collar carried by said axle adjacent said wheel, a series of tractor blades slidably mounted upon said wheel, a movable cam supported adjacent the wheel, said tractor blades having heads adapted to engage said cam, means to move said cam and cause successive engagement of the heads therewith, said means comprising a frame carried by said axle, and supporting said movable cam, toothed bars carried by said frame, a lug carried by said collar and projecting therefrom and adapted to engage said toothed bars, means to move said toothed bars into engagement with said lug, and a locking means to hold said cam in engagement with said tractor blades.

3. In a device of the kind described, an axle, a wheel carried by said axle, a collar carried by said axle, a series of tractor blades slidably mounted upon said wheel, a movable cam supported adjacent the wheel, said tractor blades having heads adapted to engage said cam, means to move said cam and cause successive engagement of the heads therewith, said means comprising a frame carried by said axle, and supporting said movable cam, toothed bars carried by said frame, a lug carried by said collar and projecting therefrom and adapted to engage said toothed bars, arms carried by said frame adjacent said toothed bars, each arm provided with a bent portion terminating in a crank portion, said crank adapted to be moved whereby said arm will bear upon said toothed bar and move the same in engagement with said lug, and locking means to hold said cam in engagement with said tractor blades.

4. In a device of the kind described, an axle, a wheel carried by said axle, a collar carried by said axle, a series of tractor blades slidably mounted upon said wheel, a movable cam supported adjacent the wheel, said tractor blades having heads adapted to engage said cam, means to move said cam and cause successive engagement of the heads therewith, said means comprising a frame carried by said axle supporting said movable cam, toothed bars carried by said frame, a lug carried by said collar and projecting therefrom and adapted to engage said toothed bars, means to move said toothed bars into engagement with said lug, a bracket carried by said axle adjacent said cam, said bracket provided with a bent portion, a short arm provided with teeth connected to said cam and positioned above said axle adjacent said bracket, said teeth of said short arm adapted to engage said bent portion of said bracket for holding said cam in engagement with the heads of said tractor blades, and a lever carried by said frame for releasing said short arm from engagement with said bracket.

In testimony whereof I hereunto affix my signature in presence of two witnesses.

SAMUEL F. DOUGLASS.

Witnesses:
GEO. A. REIFEL,
CHAS. J. KREIBS.